United States Patent [19]
Weinstein

[11] 3,711,060
[45] Jan. 16, 1973

[54] ZONE CONTROL VALVE ASSEMBLY

[75] Inventor: Richard Weinstein, Evanston, Ill.

[73] Assignee: International Telephone and Telegraph Company, New York, N.Y.

[22] Filed: Oct. 12, 1970

[21] Appl. No.: 80,011

[52] U.S. Cl. .................251/11, 137/468, 236/99, 277/9
[51] Int. Cl. .............................................F16k 31/00
[58] Field of Search.....277/9, 112; 137/468; 251/11, 251/214; 236/86, 87, 99, 100, 101

[56] References Cited

UNITED STATES PATENTS

| | | | |
|---|---|---|---|
| 3,100,621 | 8/1963 | Zeitlin | 251/214 |
| 3,472,479 | 10/1969 | Sherwood | 251/11 |
| 2,829,860 | 4/1958 | Garner et al | 251/214 X |
| 3,273,850 | 9/1966 | Kolze | 251/11 |
| 3,582,041 | 6/1971 | Priese | 251/214 X |

*Primary Examiner*—Meyer Perlin
*Assistant Examiner*—Ronald C. Capossela
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

Valve assembly for zone control valves of the type employed in hydronic temperature control systems. The valve incorporates a control unit which can readily be separated from the valve structure without emptying fluid from the system. An improved sealing structure provides the valve itself and allows the separation noted above. In this way, the control unit and the valve seals can be replaced readily in the field, are long-lived and capable of continuous trouble-free usage. Variations in the control of the heating system are also shown.

10 Claims, 10 Drawing Figures

PATENTED JAN 16 1973 3,711,060
SHEET 1 OF 3
FIG. 1
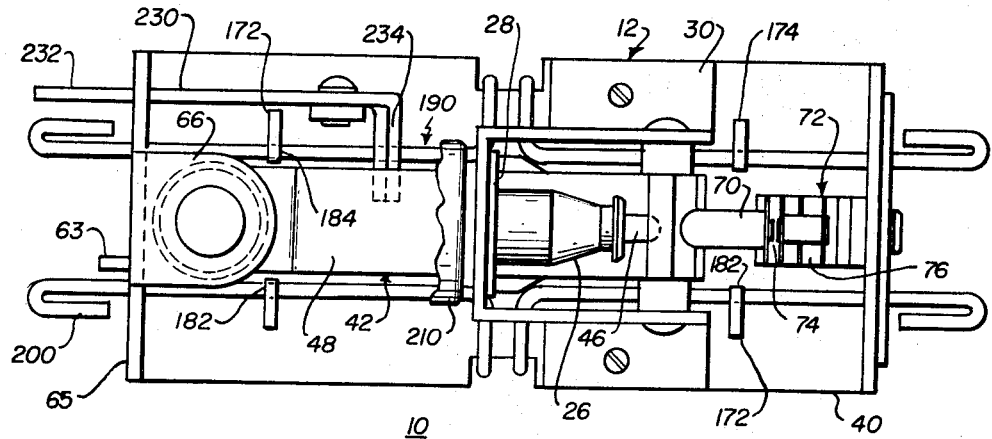
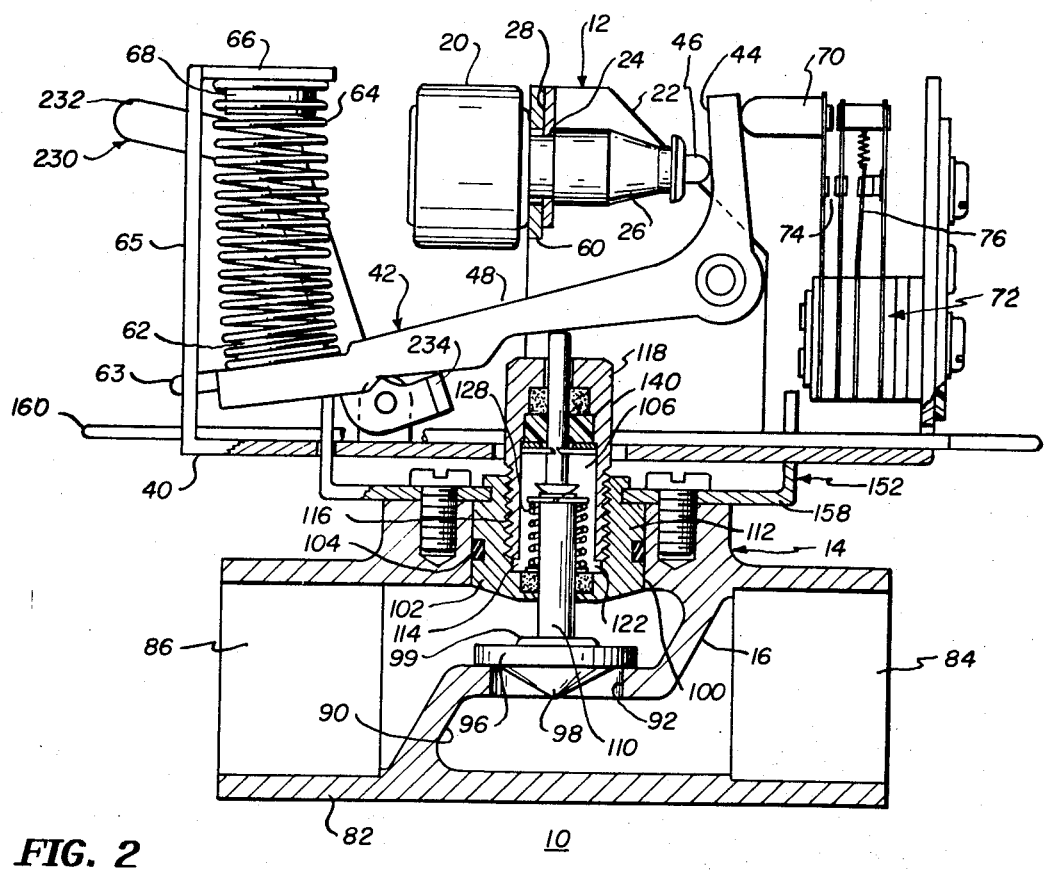
FIG. 2
INVENTOR
Richard Weinstein
BY Marvin Chaban
ATTY.

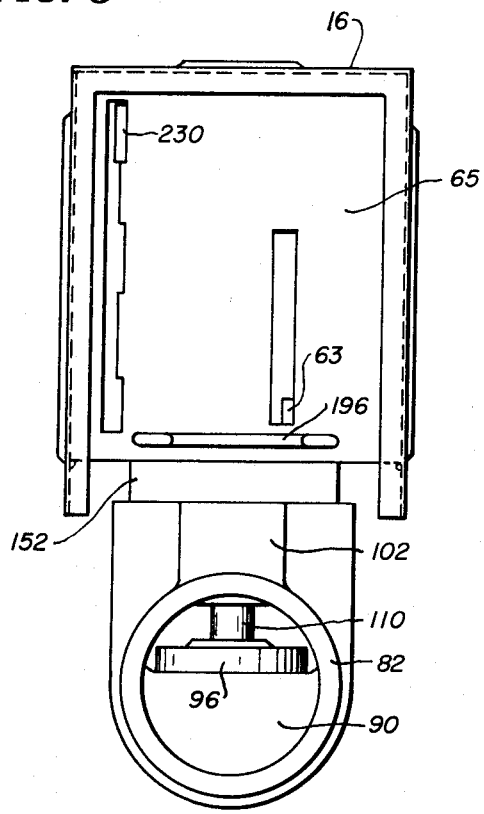
FIG. 3
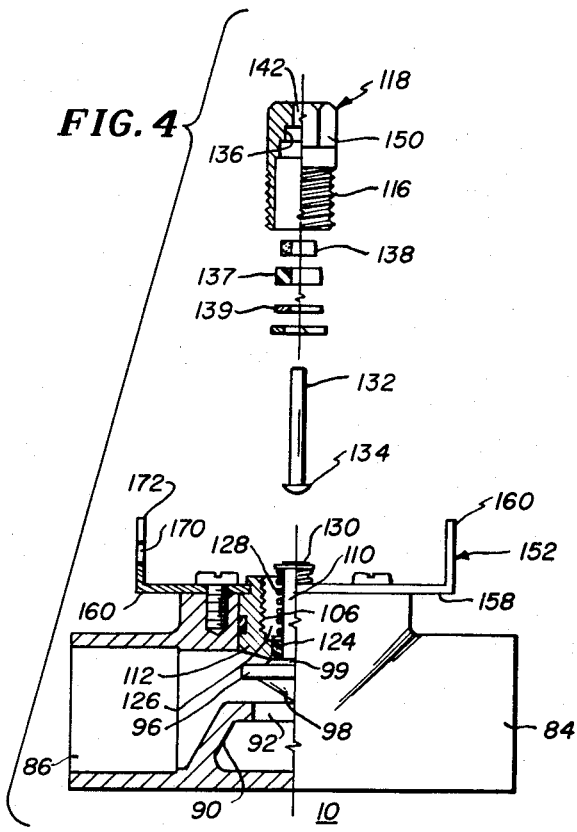
FIG. 4
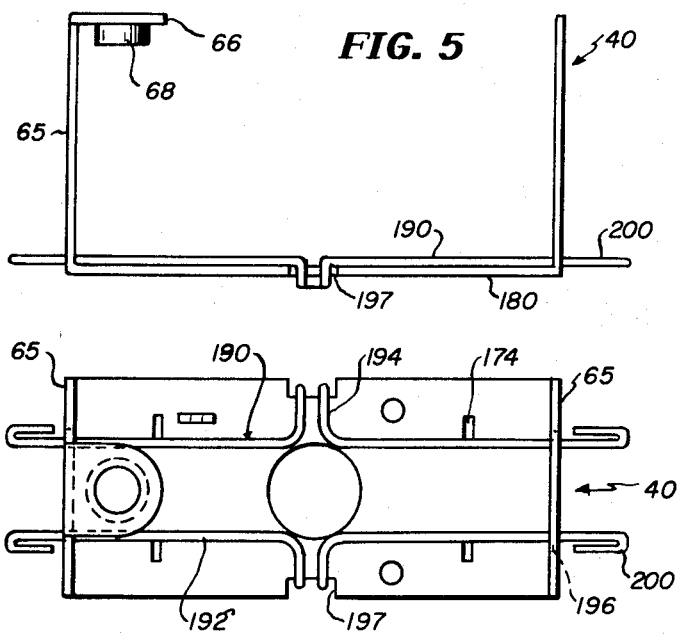
FIG. 5
FIG. 6
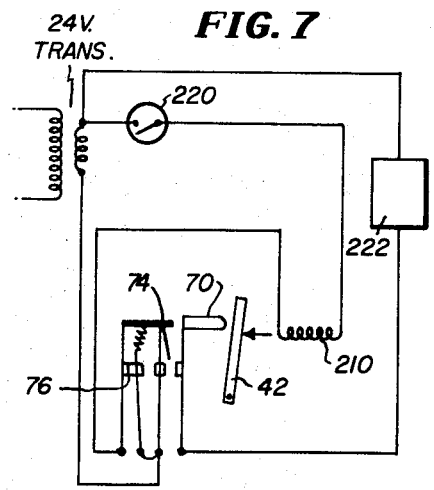
FIG. 7
INVENTOR
Richard Weinstein
BY Marvin Chabon
ATTY.

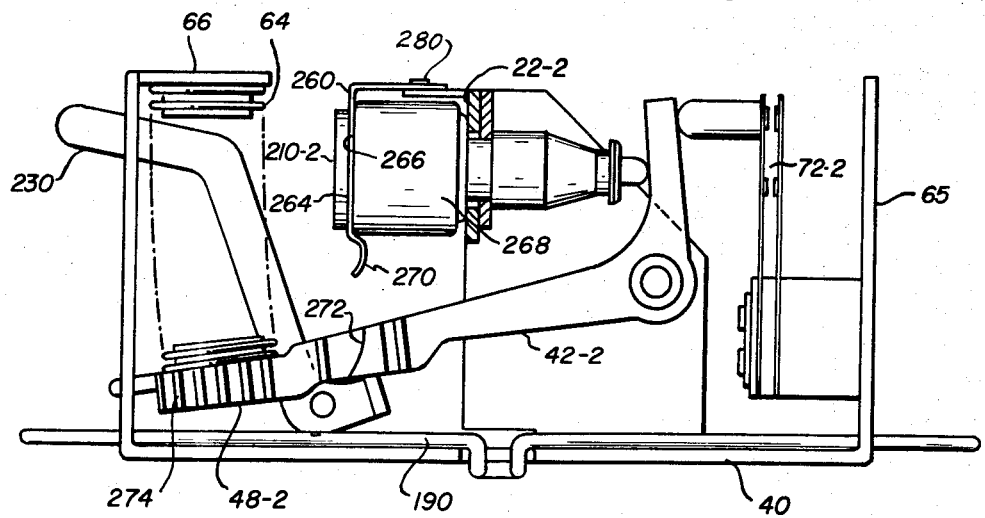
FIG. 8
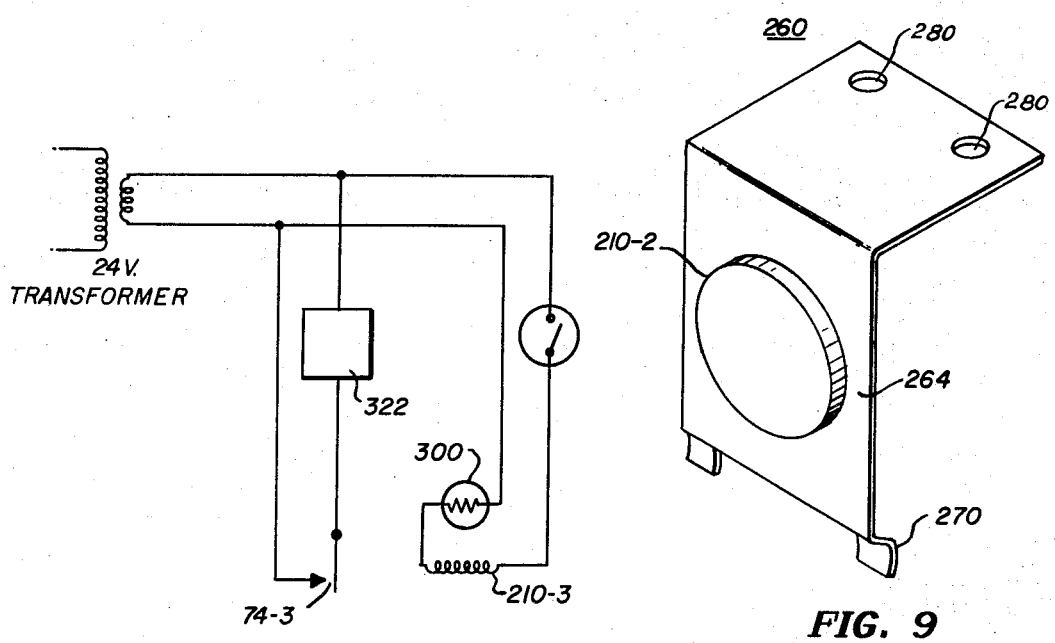
FIG. 10
FIG. 9
INVENTOR
Richard Weinstein
BY Marvin Chaban
ATTY.

ZONE CONTROL VALVE ASSEMBLY

BACKGROUND OF THE INVENTION

This invention relates to hydronic temperature control systems. More particularly, it relates to zone control valves and valve units for use in such systems.

A zone control valve is a device which regulates the flow of fluids or liquids, which may be either heated or cooled, as a function of the temperature sensed by a thermostatic sensor. The valve opens or closes to control the flow volume, in response to the temperature sensed by the thermostatic sensor.

Present day hydronic temperature control systems utilize these zone control valves to regulate the flow of heated or cooled fluid through the coils of heat exchangers which are employed for either heating or cooling specified areas or zones. Because of the regulatory effect of the zone control valves, the temperatures of the zones served by the exchangers are effectively controlled.

The zone valves are frequently constructed as a combination of a heat expansible motor assembly which actuates a piston extending through a wall seal to a valve. As a suitable thermostatic sensor senses the need for an increase in the temperature in the zone to be controlled, the heat expansible motor assembly is caused to operate, if necessary, and the motor causes the valve stem or rod to move, thus adjusting the position of the valve.

In known zone valves of the type described, it has been commonplace to use a number of different devices such as diaphragms, metal bellows and the like for sealing the wall port where the actuating rod moves through the wall to translate the motion of the motor to the valve. However, some problems have arisen due to the sealing devices employed heretofore. For example, the diaphragms have tended to experience mechanical fatigue responsive to actuation of the valve assembly, thus causing relatively short usable life spans therefor. The use of bellows, whether metal or elastomeric, has entailed considerable tooling and raw material expense, has tended to be more costly than is desirable considering the total value of the entire valve assembly. The metal bellows also tends to encounter mechanical fatigue problems. In addition, the metal bellows has required unique treatment for sealing metal to metal such as the installation of gaskets, O-rings, cement and the like. Furthermore, the requirements for sealing the diaphragm or metal bellows to the wall of the valve have introduced a number of assembly and maintenance problems, thus, increasing the cost of manufacture and the cost of maintaining the unit.

SUMMARY OF THE INVENTION

My invention comprises an improved automatic fluid control valve. This valve permits great ease of installation, maintenance, and manufacturing coupled with sophisticated operation not seen in similar valves.

The body of the valve may be installed into a fluid line or air line without the seat assembly. After threading or soldering, the moveable seat and seal assembly are inserted into the valve body where a static seat O-ring is engaged and two screws hold assembly to body. The valve is normally open so that mechanic can check entire piping loop.

The drive assembly (motor operator) is slipped onto valve body where it is "snapped" firmly onto the body. This allows easy installation in hard-to-get-to areas where screws would be difficult to use. Conversely, if the drive unit has to be removed from valve body one merely squeezes the protruding lever (at each end of unit) together, and lifts the drive unit easily from body and seat assembly.

The seat assembly is spring loaded in the open position. When the drive unit is snapped onto the body, it depresses a pin, which protrudes from seat assembly, thereby pressing a rubber disc against the valve seat and prevents any flow through the valve.

When the valve is to be opened, energy is provided to the heat motor which extends its piston onto a pivotal lever. As the lever rotates about its fulcrum, it compresses a spring while also allowing the pin to be raised from the valve disc and thereby permitting the valve to assume its open position.

When one wishes the valve to close, energy is removed from the heat motor so that the compressed spring may now move the lever so that the valve pin is pressed down thereby closing the valve seat, and the heat motor piston is restored into the heat motor.

The valve has a manual lever protruding from the drive assembly. This lever may be pressed down and locked. The lever mechanically lifts the main operating lever, which compresses the spring and allows valve pin to assume an open position.

Whenever the main operating lever moves up or down it positions an indicator outside the drive unit which allows a visual indication of whether the valve is open or closed.

Finally, if the seal through which the valve pin moves should become worn and leak, one may remove the drive unit and unscrew the entire pin-seal assembly. This may be done without regard to fluid in the system, since as the assembly is removed, the rubber seating disc is raised up by spring tension, and closes the small port area which is exposed to atmosphere, thereby preventing any leakage from the valve. A new pin-seal assembly may be screwed into place, also without leakage from valve.

This valve utilizes a special loose fitting O-ring as a filter between the actual seal and the system, thereby preventing large quantities of dirt from reaching and damaging the seal.

Of further interest is the heat motor and its method of control. Most valves employing this type of drive unit apply heat to the motor with an electric resistance heater. When heat has caused the piston to extend to a given distance, the piston, which has been causing the valve to open, also opens an electrical switch which removes electricity from the heater. The heat motor now begins to cool, and the piston is slowly pressed back into the motor thereby closing the switch and making electrical contact to the heater once again. The piston, in effect, oscillates between a fixed range causing the valve to also open and close partially.

My valve employs a new and improved method of controlling heat to the heat motor.

One approach I use is to employ a heater whose resistance is responsive to temperature. This method uses various materials such as stainless alloys (heating wire) whose resistance can change greatly as the temperature increases, and also may include in proximity to the heater components such as thermistors or the like.

This method is superior to those using switches, because when a given predetermined temperature is reached by the heater, the piston of the heat motor has advanced to its actuated position. At this point, the resistance of the heater has increased and caused the heat to stabilize (self limiting) so that the piston is stopped within close tolerances, and does not modulate in and out.

My system also has an alternate method, whereby the heater is physically separable from the heat motor (but is spring loaded to normally contact the heat motor). At the predetermined temperature reached by the heat motor, the piston extends from the heat motor, thereby rotating the lever about its fulcrum. The lever moves into contact with the heater to separate the heater from the motor at a given point in the lever movement. The lever has heat dissipating fins and so removes much of the heat from the heater and thereby stabilizing the flow of heat to the heat motor. This method will tend to slow or stop the piston from further movement. If, however, the external (ambient) conditions do not allow enough heat to be channelled into the lever, continued movement of the lever will physically lift the heater away from any contact with the heat motor; thereby limiting any further piston movement.

This method also prevents oscillation of the piston and greatly expands the operational life of the heat motor. In addition, by eliminating electrical switches, I eliminate one major cause of shortened switch life arising due to continuous arcing, caused by very slow make and break of the switching contacts.

Accordingly, an object of this invention is to provide a new and improved zone control valve and control unit therefor.

A further object is to provide zone valves having new and improved sealing assemblies between the operating motor and the valve unit.

Another object of the invention is to provide a readily replaceable control unit for these valves. Yet another object of the invention is to provide a control unit for the valve with a minimum of metal-to-metal contact between the control unit and the flow passage and has an insulating airspace therebetween.

Yet another object of the invention is to provide zone control valves having a dual seal which is easy to assemble and allows ready removal of the main seal, if necessary.

These and other objects, features and advantages of my invention and the manner of obtaining them will become more apparent, and the invention itself will be best understood by reference to the following description of the preferred embodiment of the invention taken in conjunction with the accompanying drawings.

BRIEF DESCRIPTION OF THE DRAWINGS

FIG. 1 is a plan view in elevation of my zone control valve assembly;

FIG. 2 is a side view of the valve assembly of FIG. 1; with the valve unit partially broken away to show the interior thereof;

FIG. 3 is an end view in elevation of the assembly of FIGS. 1 and 2;

FIG. 4 is a side elevation, partially sectioned and partially exploded showing the valve unit of FIGS. 1-3;

FIG. 5 is a side view in elevation of the main support bracket for the control motor unit.

FIG. 6 is a plan view of the bracket of FIG. 5;

FIG. 7 is a schematic circuit diagram for the embodiment of FIGS. 1-6;

FIG. 8 is a side view in elevation of the control motor assembly showing a second embodiment of my invention;

FIG. 9 is a prospective view of a heater element holder as used in the embodiment of FIG. 8; and FIG. 10 is a schematic circuit diagram as usable in a third embodiment of the invention.

DESCRIPTION OF THE PREFERRED EMBODIMENTS

FIGS. 1 and 2 show a first embodiment of my zone control valve assembly 10 using the teachings of my invention. More particularly, the major units of this valve assembly 10 can be considered in two parts, that is, a control unit 12 and a valve unit 14. The control unit 12 positions the valve responsive to ambient conditions sensed by a remote temperature sensor. The valve unit 14 comprises a poppet valve assembly including a valve body, inlet and outlet ports and a valve sealing means.

The control unit is protected from dirt and dust by a suitable 3-sided dust cover 16 shown only in FIG. 3, which may be fabricated of sheet material or the like. The control unit used herein is of the heat motor-actuated type which includes a heat motor assembly 20 mounted for horizontal movement within a suitable U-shaped motor mounting bracket 22. A suitable opening 24 is provided in the motor bracket to receive the motor piston guide 26. The motor is secured to the bracket by means of a retaining washer 28 fitted within an annular depression in the piston guide 26 and restraining the motor firmly against the back of bracket 22. The bracket 22 is secured to the assembly by means of outwardly extending feet 30 which rest on a main support member 40 which comprises a substantially U-shaped metal bracket with its long dimension extending parallel to the direction of flow through the valve unit.

Pivotally mounted to the legs of the U-bracket 22 is bell crank 42, whose short lever arm 44 is operably positioned adjacent the piston 46 of the heat motor assembly 20. The long lever arm 48 of bell crank 42 extends through a suitable aperture 60 in bracket 22, which allows movement of arm 48. At the outermost end an elongation of the long lever arm 48 provides an indicating finger 63 which protrudes through a slot in vertical end plate 65 of main member 40. Lever arm 48 has secured on its upper surface a spring retaining pad 62. About the pad is mounted a comparatively heavy compression spring 64. The remote end of the spring 64 is held by a retaining ear 66 which may be formed integrally as a re-entrant portion part of the main support end plate 65. A suitable pad 68 on the underside of the ear maintains the compression spring firmly in place. The spring 64 maintains bell crank 42 in the position shown in FIG. 2 maintaining the valve closed to flow.

Adjacent the outer side of bell crank lever arm 44 is the operating buffer 70 of an assembly or pileup 72 of flat springs. The pileup includes a make combination 74 which will be called herein the auxiliary combination and a break-make combination 76 which will be called herein the main spring combination, or limit switch. The make combination has its contacts normally open and the break-make combination as is well-known has one closed contact section which is opened on movement of the buffer and the make section is thereby closed accordingly.

The valve unit 14 is generally defined by a tubular valve body 82 having an inlet port 84 at one end and an outlet port 86 at the other end, the two ports being coaxially aligned with one another. A bulkhead 90 separates the ports in an offset configuration between the inlet port and the outlet port. Centrally located in the bulkhead is a circular opening 92 whose diameter is generally parallel to the direction of flow into and out of the tubular valve body. Opening 92 comprises a circular valve seat within the bulkhead 90 allowing communication between these ports.

Seated in the opening of the valve seat is a self-aligning seat disc 96 preferably constructed of an elastomeric material and having a central conic tip 98 entrant into the circular opening 92 to open and close the valve. The upper inner section of disc 96 has an annular sealing rib 99 as will be explained later. The valve unit further has a valve opening 100 perpendicular to the flow into and out of the tubular ports and aligned coaxially with the valve seat opening 92. Within the valve opening 100 is mounted a tubular, metallic sealing plug 102 which is tightly fitted into the opening and sealed therein by means of an O-ring 104 resting within an annular ring well on the plug outer wall. Within the central cavity 106 of the sealing plug is aligned the valve operating stem 110. This stem is affixed to the valve disc 96 to condition the disc in either a first position blocking flow (as seen in FIG. 1) or a second position allowing flow through the valve seat as shown in FIG. 3 or 4.

The sealing plug 102 as shown best in FIGS. 1 and 3 comprises two metallic mating members, the first being an outer lower plug member 112 which abuts the valve opening 100 and is sealed thereagainst by means of the O-ring 104 previously referred to. The lower member has upwardly directed central cavity 114 suitably threaded to receive the external threading 116 on the second member 118, an upper gland or shell member. Within cavity 114 the lower member 112 has a cuplike wall 122 which supports an elastomeric O-ring 124 in a comparatively loose fitting arrangement about the valve stem, serving to filter all matter entering the plug, but not having a tight enough fit to allow pressure buildup within the plug cavity.

Extending outwardly of the cup wall is a shoulder 126 which holds one end of compression spring 128 about the valve stem. The stem has a ring groove near its upper end holding a metal O-ring to compress spring 128 and provide a normal upward bias on the valve tending to open the valve. The valve stem has at its upper extremity a central depression 130 which supports the head of a lever operating rod 132. The head 134 of the rod rests within depression 130 and its body extends upwardly.

Within the upper shell member 118 is formed a central O-ring cup 136 about the operating rod opening 142. Cup 136 supports primary sealing members which form a sealing action between the O-ring cup and the body of lever operating rod 132. The ring comprises a felt washer 137, an elastomeric washer 138 and both are retained in place by a metal washer 139. Of course, the head 134 of rod 132 is larger than the diameter of the rod opening 142 within cup 136, such that the rod is retained within the sealing plug 102 in vertical alignment with the valve stem 110.

The upper sealing ring 138 is one which is designed to fit tightly about the lever operating rod 132, and provides the major sealing of the control unit 12 from the valve assembly 10.

The upper shell member has at its upper end an enlarged hex head 150 which confines outwardly therebelow a coupling bracket 152. The bracket has a circular opening sized to receive the externally threaded member 116 and may be brazed, sweated or otherwise affixed thereto. Two screws mating into holes in the valve body may act to complete the mounting of bracket 152 to the valve assembly.

With this construction, the bias imposed by spring 128 tends to raise the valve stem and valve 96 out of the valve seat, opening the valve to flow.

The coupling bracket 152 serves to mate the control unit 12 to the valve body in the following manner: Offset from the body 158 of bracket 152 are parallel mounting arms 160. Each arm 160 has a horizontally disposed medial shoulder 170 and vertically extending therefrom at its ends spaced fingers 172. Fingers 172 protrude through suitable passages 174 in the main support member 40. With the fingers fully extended through the passages, the main body 180 of support member 40 abuts against shoulders 170. To firmly hold this mating relationship, each of the fingers 172 has a horizontally extending lug 182 which forms therebelow a hook opening 184 spaced above the main body 180. These hook openings 184 receive suitable wire restraining members 190. To firmly hold the mating relationship, two wire restraining members are used. These members each have a straight portion 192 extending within the hook openings 184. Adjacent the hex head 150 of the upper shell member, each member 190 has an ear 194 which abuts the hex head 150 and is downturned about a suitable notch 197 in the main body 180. The straight portion of each restraining member extends through a suitable slot 196 in the upstanding walls or end plates 65 of support member 40 and each end terminates in a formed J-shaped end 200 which allows the wires to be readily grasped and depressed one toward the other. By depressing the wire restraining members one toward the other, they free the engagement of the hook openings 184 by forming a lever action about the hex head 150. By removing the mating of the wire restraining members and the hook openings the control unit 12 may be readily detached from the valve unit 14.

The heat motor assembly 20 may be any heat expansible motor including a high pressure casing, a heater unit 210, a heat expansible material such as paraffin, solid wax and the like, a container to hold the expansible material and a piston rod 46. The piston rod 46 is actuated by the expansible material being heated by the heater unit 210, the heater being controlled by the limit switch mechanism of the switch actuator bell crank 42.

The valve unit is of globe type design. The inlet 84 of valve unit 14 is connected to a supply pipe-line providing either hot or cold fluid. The outlet 86 is connected to a pipe-line leading to the fan coils or other heat exchanging means located in the temperature controlled zone. The valve seat disc 96 is constructed of long-wearing, water and corrosion resistant elastomeric material providing a self-aligning, resilient, renewable pressure seal surrounding the valve stem 110. The seat disc is engaged by return or closure spring 128 which is compressed between the opposed cups 122 and 138 in the stem plug body 102.

In greater detail, the valve assembly 10 may be mounted in a hydronic system in a manner such that the ports, inlet 84 and the outlet 86, of the valve assembly 10 are connected to pipe-lines leading to fan coils or other heat exchanging means located in the temperature controlled zone. A thermostat 220 (FIG. 7) is positioned in the temperature controlled zone to control operation of the valve assembly 10 as a function of the temperature in the zone. When the thermostat 220 calls for either heating or cooling, its contacts close to low voltage power (e.g., 24 volts as shown in FIG. 3) to the heater unit 210 of heat motor assembly 20 thus heating the expansible material therein. When the heat motor assembly 20 reaches operating temperature, the heat expansible material expands and exerts pressure on piston 46 forcing the piston to move outwardly depressing switch actuator bell crank 42. As the actuator bell crank 42 is depressed by piston 46, it pivots causing actuator rod 132 to release its downward force on valve stem 110. Thereby, valve stem 110 is released and restores upwardly under the bias imposed by spring 128. Upward motion of valve stem 110 causes disc 96 to move. Consequently, the valve seat disc 96 is raised out of the valve opening 100 thereby opening the valve to permit flow of temperature determining fluid through the system.

Also, on movement of bell crank 42, buffer 70 is deflected closing the make combination 74 to any outside circuit 222 and opening the limit switch of the break-make combination 76, thereby opening the circuit to the heater unit 210, thereby deenergizing the heater. The heater cools down and the bell-crank 42 restores under the bias of spring 64 to override the bias of spring 128 and return the assembly to its normal condition with the valve preventing flow between ports.

Further within FIGS. 1 and 2, there is shown an offset manual control lever 230. This lever has an operating handle 232 extending past the main support end plate 65. The lever 230 is pivotally mounted above the main support 40 and has an offset portion 234 positioned under lever arm 48 of bell crank 42. Normally, the compressive force of spring 64 maintains the bell crank long lever arm 48 depressed and thereby maintains offset 234 depressed, and handle 230 elevated.

The manual lever may be pivoted downwardly manually to an intermediate position partially opening the valve unit but not affecting the spring pile-up closures. This lever 230 cocks bell crank 42 to an intermediate position, allowing the valve stem to rise partially. A suitable notch in the end plate 65 may be used to hold the handle in this position. The handle may be moved to its lowest level elevating the lever arm 48 and actuating the valve assembly fully, both as to spring pile-up 72 and as to the valve itself. A notch in the wall of the end plate 65 may be used to maintain this condition.

As mentioned briefly previously, the sealing arrangement about the valve stem and valve rod comprise one of my inventive features. The lower O-ring 124 is fitted to the valve stem with a loose fit. The upper or primary ring 136 has a tight-fitting relationship about the operating rod 132. First of all, with the comparative loose fit of the lower ring, no pressure buildup within the plug cavity is possible. Secondly, the lower ring acts as a filter to prevent contaminants from entering the plug cavity.

Second, the dual sealing arrangement allows the primary or upper seal to be replaced without disabling the fluid flow system and without isolating the valve. The heater control unit is removed by release of the wire restraining members and subsequent lifting of the control unit. Removal of the bell crank 42 relieves the downward force on the valve rod and valve stem 110 rises under the bias of spring 128. The gland or shell member 118 is unscrewed from the threaded body 116 of the lower plug member 112. The valve disc 96 rises opening the valve to flow between ports and the annular rib 99 in its upper surface is compressed against the underside of plug 102 sealing the plug against flow from the valve port. The primary O-ring 138 can thus be replaced and shell member or gland 118 restored without disabling the system.

Following such replacement of the sealing ring, the control unit can be restored to its operational positioning by placing the unit such that fingers 172 protrude through the slots in the main support, and the wire restraining members restored to position under the lugs 182 locking the control unit in operative position relative to the valve unit once again.

In FIG. 8, I show a second embodiment of my invention. In this embodiment the valve unit is identical to that previously shown. The control unit is identical to that previously shown except for the spring pile-up, the heater motor and the bell crank.

In spring pile-up 72-2 (the final 2 designating the second embodiment), the break-make combination 76, called previously the limit switch, has been omitted. In the prior embodiment, this switch once opened responsive to movement of the motor piston opened the circuit to the motor heater.

In this second embodiment, heater unit 210-2 comprises a heater such as a pelletized heater roughly wafer-shaped suitably affixed to flat spring holder 260. The holder is mounted to the bracket 22-2 and extends freely above the motor body. Holder 260 has a heater 264 adjacent the rear surface 266 of the motor body 268 and terminates in spaced detent members 270 at its lower end. The detent 270 is poised above a curved cam surface 272 on or incised in the long lever arm 48-2 of bell crank 42-2. It is preferable that cam surface 272 be a heat conductive member to draw heat from the heater to the mechanical structure of the central unit. Cooling fins 274 may also be provided in the lever arm 48-2 to aid in dissipating heat as will be described.

The heating unit 210-2 as mentioned is pelletized and is secured to holder 260 in its enlarged portion 264 facing the rear surface 262 of the motor. The holder is secured to the mounting bracket at points 280.

In this embodiment, when the thermostat (not shown) is closed to complete a direct path to the heater unit 210-2 the heater heats the motor until the time that piston 46-2 projects to pivot the bell crank 42-2. The lower arm 48-2 of the bell crank rises and cam surface 272 engages the detent member 270 to physically draw the heater unit 210-2 away from the motor. The distance between the heater and motor allows the motor to cool withdrawing its piston and restoring bell crank 42-2 to its normal position, due to the inherent spring characteristics of holder 260, and its mounting at brackets 280.

The third embodiment shown only in the circuit of FIG. 10 is identical to that of FIGS. 1 and 2, except that limit switch 76 (the break-make combination) is once again omitted. A thermistor or suitable temperature-sensitive resistor 300 is physically disposed in close proximity to the heater unit 210-3 and motor body. This thermistor 300 senses the rise in temperature caused by the heater and electrically increases its resistance to decrease the current flowing to the heater, thereby lessening its ability to heat. The parameters of the circuit would be selected to cause the resistance increase to occur after the motor had reached a predetermined temperature and had actuated its piston. In this way the thermistor would effectively limit the further heat generated by the heater once the piston had been advanced.

A combination of the second and third embodiments could also be employed to provide both physical and electrical means for decreasing the heat generation of the heater once its effect on the motor and piston had been completed.

While there has been described what is at present thought to be the preferred embodiments of the invention, and it is understood that modifications may be made therein and it is intended to cover in the appended claims all such modifications which fall within the true spirit and scope of the invention.

I claim:

1. A control valve assembly comprising a valve body having an inlet and outlet port, valve means in said valve body for controlling fluid flow through said valve body, wall means separating said inlet and outlet ports, an opening in said wall means, a self-aligning elastomeric valve closure for providing a pressure seal closing said opening when said valve means is in a first position, means for positioning said valve closure in a second position to allow fluid flow through said valve body, thermostatic valve closure control means for actuating said positioning means, said positioning means including separable motion transmitting structure controlling the valve closure, first means sealing said structure to channel the escape of fluids to an area adjacent to said structure, second means sealing said structure against fluid passing said first means, said enclosing means removable to allow separation of said structure from said valve body without draining said fluid from said valve body, means in said enclosing means allowing the removal of said second means for replacement, and means for retaining the valve closure in a pressure seal against said motion transmitting structure when said structure is separated.

2. An assembly as claimed in claim 1, wherein said motion transmitting structure comprises a composite valve stem movable in a translatory manner, and including motive means responsive to said control means for effecting the movement of said stem and said valve closure, and means for coupling said motive means to said stem, and means permitting ready detachment of said motive means from said stem to permit access to said stem and said valve means.

3. An assembly as claimed in claim 1, wherein said valve means comprises a poppet valve, said valve closure comprises an elastomeric disc, and said motion transmitting structure comprises a composite valve stem and a housing enclosing said stem, and said assembly further includes means normally biasing said valve disc to a position sealing entry to said stem housing.

4. A control valve assembly comprising an inlet port, and outlet port and a valve therebetween operative to regulate flow from said inlet to said outlet port, thermostat means, means for controlling the operation of said valve, said controlling means including heating means operative responsive to an indication from said thermostat means, means located in proximity to said heating means and responsive to the operation thereof for actuating a movable member, and means for transferring the actuation of said movable member into movement of said valve to permit flow therethrough, said transferring means including means normally biasing said valve to a flow-permitting state and a coupling member positioned to override the biasing means and prevent flow through said valve, said coupling member responsive to actuation of said movable member to operate said valve to its flow-permitting state.

5. An assembly as claimed in claim 4, wherein there are means for physically separating said heating means from the means responsive thereto following response of said coupling member whereby to allow said heating means to cool and thereby restore said valve to prevent flow therethrough.

6. An assembly as claimed in claim 4, where there are thermosensing means located in close proximity to said heating means to reduce the heating of said heating means at a predetermined level following operation of said valve to its flow-permitting state.

7. An assembly as claimed in claim 4, wherein there are means controlled by the response of said coupling member to thermally isolate said heating means from the means responsive thereto.

8. A valve assembly for controlling the flow of fluid through a valve seat from an inlet port to an outlet port comprising, a poppet valve having a valve closure and a valve stem for moving said valve closure, a control assembly mounted to act on the stem of said valve to regulate the movement of said valve, valve stem sealing structure mounted on said stem and comprising an enclosing housing, a first sealing member positioned within said housing on said stem at the valve seat end thereof, said first member sealing the stem from fluid passing from the seat, and a second sealing member within said housing spaced from said first member at the remote end thereof, said second member further sealing said stem and said housing to prevent leakage of any fluid which leaks past said first sealing member into said housing.

9. An assembly as claimed in claim 8, wherein said sealing members both comprise spaced apart O-rings of elastomeric material fitted about the valve stem, and said first member filters any fluid passing into said housing.

10. An assembly as claimed in claim 8, wherein said housing includes a removable section, removal of said section allowing access to said second sealing member for ready replacement thereof, and means for biasing said valve closure to a position blocking flow from about said valve stem.

* * * * *